(12) United States Patent
Akiyama (10) Patent No.: US 10,101,168 B2
(45) Date of Patent: Oct. 16, 2018

(54) ROUTE CALCULATION DEVICE FOR VEHICLE

(71) Applicant: TOYOTA JIDOSHA KABUSHIKI KAISHA, Toyota-shi, Aichi-ken (JP)

(72) Inventor: Tomonori Akiyama, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 213 days.

(21) Appl. No.: 15/026,732

(22) PCT Filed: Sep. 1, 2014

(86) PCT No.: PCT/JP2014/004474
§ 371 (c)(1),
(2) Date: Apr. 1, 2016

(87) PCT Pub. No.: WO2015/056394
PCT Pub. Date: Apr. 23, 2015

(65) Prior Publication Data
US 2016/0231130 A1 Aug. 11, 2016

(30) Foreign Application Priority Data
Oct. 18, 2013 (JP) .................................. 2013-217622

(51) Int. Cl.
*B60W 30/09* (2012.01)
*B60W 30/095* (2012.01)
*G01C 21/34* (2006.01)
*B60W 10/184* (2012.01)
*B60W 10/20* (2006.01)

(52) U.S. Cl.
CPC ......... *G01C 21/3461* (2013.01); *B60W 30/09* (2013.01); *B60W 30/0956* (2013.01); *B60W 10/184* (2013.01); *B60W 10/20* (2013.01); *B60W 2520/06* (2013.01); *B60W 2520/14* (2013.01); *B60W 2550/10* (2013.01)

(58) Field of Classification Search
None
See application file for complete search history.

(56) References Cited

U.S. PATENT DOCUMENTS

| 2008/0086269 | A1* | 4/2008 | Joe | ........................ | B60W 30/09 |
| | | | | | 701/301 |
| 2013/0226445 | A1 | 8/2013 | Nagata | | |
| 2014/0244114 | A1 | 8/2014 | Matsubara | | |
| 2014/0244142 | A1 | 8/2014 | Matsubara | | |

FOREIGN PATENT DOCUMENTS

| WO | 2012/114478 A1 | 8/2012 |
| WO | 2013/051081 A1 | 4/2013 |
| WO | 2013/051083 A1 | 4/2013 |

* cited by examiner

*Primary Examiner* — John Olszewski
*Assistant Examiner* — Gerrad A Foster
(74) *Attorney, Agent, or Firm* — Sughrue Mion, PLLC (57) ABSTRACT

A route calculation device determines a candidate point for a branch off a first avoidance route to a second avoidance route at a time of calculating the second avoidance route. The candidate point is determined based on a traveling direction and speed of a vehicle at each point on the first avoidance route, a tangential direction of a boundary line of a second avoidance area at a predicted entry point into the second avoidance area, and a certain yaw rate not more than a maximum yaw rate of the vehicle.

8 Claims, 7 Drawing Sheets

ROUTE CALCULATION DEVICE FOR VEHICLE

CROSS REFERENCE TO RELATED APPLICATIONS

This application is a National Stage of International Application No. PCT/JP2014/004474 filed Sep. 1, 2014 claiming priority based on Japanese Patent Application No. 2013-217622, filed Oct. 18, 2013, the contents of which are incorporated herein by reference in their entirety.

TECHNICAL FIELD

The present disclosure relates to a route calculation device for a vehicle that calculates a route for avoiding a plurality of objects to be avoided.

BACKGROUND ART

As a route calculation device which calculates a route (avoidance route) for avoiding an obstacle or the like, existing in a path, a device described in International Patent Publication No. WO2013/051081 is known. The device described in the same document performs calculation of a route for avoiding two objects to be avoided having been detected in a traveling direction of a vehicle on which the device is mounted in the following procedures.

First, a first avoidance route, which is a route of the vehicle capable of avoiding contact with a first object to be avoided, or the headmost object to be avoided, is calculated from the positional relationship between the first object to be avoided and the vehicle, the momentum (speed, deceleration, that is, deceleration g-force, yaw rate, and the like) of the vehicle at the time of starting the avoidance travel, and the momentum changing ability of the vehicle. Subsequently, a point where the distance from the first object to be avoided starts to change from a decrease to an increase on the calculated first avoidance route is obtained as a point where the avoidance of the first object to be avoided is completed. Further, from the positional relationship between the obtained avoidance completion point and a second object to be avoided, which is the next object to be avoided, the predicted momentum of the vehicle at the avoidance completion point, and the momentum changing ability of the vehicle, a second avoidance route, which is a route of the vehicle capable of avoiding the second object to be avoided, is calculated with the avoidance completion point as the starting point. Then, a route including the first avoidance route to the second avoidance route is obtained as a route for avoiding the two objects to be avoided.

CITATION LIST

Patent Literature

PLT 1: International Patent Publication No. WO2013/051081

SUMMARY

Technical Problem

In such conventional route calculation device, the route for avoiding two objects to be avoided is obtained by separately calculating the routes each capable of avoiding an individual object to be avoided only. Therefore, the route for avoiding a plurality of objects to be avoided can be obtained with a relatively small calculation load. However, a branch point from the first avoidance route to the second avoidance route is determined uniformly by the positional relationship between the first avoidance route and the first object to be avoided, and the range of choices of the route will be limited. As a result, there are cases where an appropriate route cannot be found.

An objective of the present disclosure is to suitably calculate a route for avoiding a plurality of objects to be avoided.

Means for Solving the Problems

In accordance with one aspect of the present invention, a route calculation device for a vehicle is provided. The route calculation device is configured to calculate a route of a vehicle on which the device is mounted. The route is for avoiding entry into two avoidance areas including a first avoidance area and a second avoidance area. The route calculation device calculates the second avoidance route after calculation of the first avoidance route. The first avoidance route is a route of the vehicle capable of avoiding entry into the first avoidance area. The second avoidance route is a route of the vehicle that branches off the first avoidance route and is capable of avoiding entry into both the first and second avoidance areas. The route calculation device is configured to determine a candidate point at which the second avoidance route branches off the first avoidance route at the time of calculating the second avoidance route. The route calculation device is configured to determine the candidate point based on a traveling direction and a speed of the vehicle at each point on the first avoidance route, a tangential direction of a boundary line of the second avoidance area at a predicted entry point into the second avoidance area, and a certain yaw rate not more than a maximum yaw rate of the vehicle.

When an avoidance motion of the vehicle starts at a certain point on the predicted route at which entry into an avoidance area is predicted, it is conceivable that the entry into the avoidance area may not be avoided unless the traveling direction of the vehicle can be changed to a tangential direction of a boundary line of the avoidance area at a predicted entry point no later than the entry into the avoidance area. Accordingly, from the traveling direction of the vehicle at one point on the first avoidance route and the tangential direction of the boundary line of the second avoidance area at the predicted entry point, the amount of change in the yaw angle of the vehicle necessary for avoiding the entry into the second avoidance area can be estimated when the avoidance motion is started from that point. On the other hand, from the yaw rate of the vehicle and the speed of the vehicle at that point, an amount of change in the yaw angle that can be achieved by the time the vehicle arrives at the second avoidance area can be estimated. Thus, these values allows a roughly estimation on whether any second avoidance route branching from that point and capable of avoiding the entry into the second avoidance area exists.

Therefore, it becomes possible in the foregoing configuration to narrow down candidate points for a branch in advance and eliminate unnecessary searches. Furthermore, a point where the second avoidance route is less likely to exist is merely excluded from the candidate points for the branch, and the candidate points for the branch are not particularly excessively limited. Thus, the range of choices of the avoidance route can be broadened sufficiently. According to the foregoing configuration, the route for avoiding a plurality of objects to be avoided can be calculated more suitably.

Further, the candidate points for the branch may be configured to be limited to points on the first avoidance route at which a value obtained by dividing an angle formed between the traveling direction of the vehicle at the point, for example, and the foregoing tangential direction by the foregoing certain yaw rate is not more than an arrival time period for the vehicle to reach the second avoidance area from the point. Further, when the boundary line of the second avoidance area is parallel with the traveling direction of the vehicle at the starting point of the first avoidance route, the candidate points for the branch may be configured to be limited to points on the first avoidance route at which the value obtained by dividing the angle formed between the traveling direction of the vehicle at the point and the traveling direction of the vehicle at the starting point of the first avoidance route by the foregoing certain yaw rate is not more than the arrival time period for the vehicle to reach the second avoidance area from the point.

It is highly likely that only a route that cannot avoid entry into the first avoidance area is found if a search for the second avoidance route is carried out at a point near the starting point of the first avoidance route. Therefore, the search for the second avoidance route is performed while shifting, in a limited range of the candidate point for the branch, the candidate point for the branch from a point near the second avoidance area to a point far from the second avoidance area, thereby allowing for more efficient search.

Further, the route calculation device can obtain the arrival time period as a time period until the vehicle arrives at the second avoidance area from the point on the first avoidance route at the time of traveling along the first avoidance route. The route calculation device can also obtain the arrival time period as a time period until the vehicle arrives at the second avoidance area at the time of traveling straight ahead from the point on the first avoidance route at the vehicle speed at that point.

DESCRIPTION OF EMBODIMENTS

FIGS. 1 to 8 describe a route calculation device for a vehicle according to one embodiment of the present disclosure.

Figure 1:
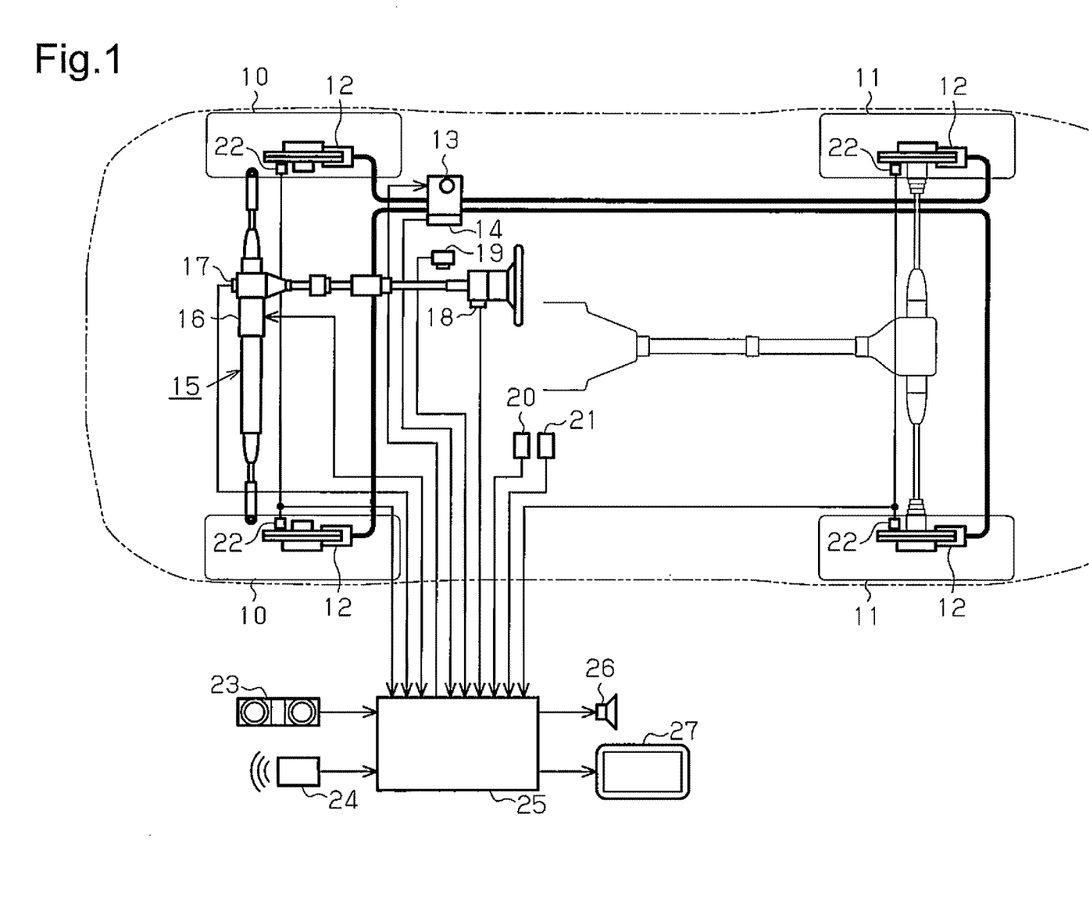
FIG. 1 configuration of a driving support system for a vehicle, to which a route calculation device according to one embodiment is applied.

FIG. 1 illustrates the configuration of a motion control system for a vehicle to which the route calculation device of the present embodiment is applied. As shown in FIG. 1, the vehicle has four wheels, that is, left and right front wheels 10 being steerable wheels and left and right rear wheels 11. The front wheels 10 and rear wheels 11 are respectively provided with braking devices 12 applying a braking force. The vehicle is provided with a brake actuator 13 regulating the hydraulic pressure (braking pressure) supplied to each braking device 12, and a braking pressure sensor 14 detecting the braking pressure.

Further, the vehicle has an electric power steering device 15. The electric power steering device 15 is provided with a motor 16 generating steering torque of the front wheels 10, and a steering torque sensor 17 for detecting the steering torque.

Furthermore, the vehicle is provided with a steering angle sensor 18 for detecting the steering angle of the front wheels 10, a brake pedal stroke sensor 19 for detecting the depressing amount of the brake pedal (brake pedal stroke) by the driver, a yaw rate sensor 20 for detecting the yaw rate of the vehicle, and an acceleration sensor 21 for detecting the acceleration acting upon the vehicle. Further, the front wheels 10 and rear wheels 11 of the vehicle are respectively provided with wheel speed sensors 22 for detecting corresponding rotational speeds, that is, wheel speeds.

Further, the vehicle is provided with a stereo camera 23 and a millimeter wave radar 24 as devices for external recognition. The stereo camera 23 uses two cameras spaced apart in the vehicle width direction to pick up images in traveling directions. The millimeter wave radar 24 outputs millimeter wavelength radio waves around the vehicle and detects objects around the vehicle from reflected waves of the output radio waves.

The vehicle is provided with an electronic control unit 25 integrally controlling vehicle motions such as braking by the braking devices 12 and steering by the electric power steering device 15. Detection signals of the above-mentioned braking pressure sensor 14, steering torque sensor 17, brake pedal stroke sensor 19, yaw rate sensor 20, acceleration sensor 21, and wheel speed sensors 22 are input to the electronic control unit 25. Further, picked-up image data of the stereo camera 23 and detection results of the millimeter wave radar 24 are also input to the electronic control unit 25. The electronic control unit 25 controls the brake actuator 13 and the electric power steering device 15 based on the input information, thereby performing integral control of the vehicle motions. Further, the electronic control unit 25 gives warning to the driver as needed through generation of warning sound by a buzzer 26 provided in a vehicle compartment of the vehicle and display of warning images by a display device 27 that is also provided in the vehicle compartment.

The motion control system for a vehicle performs support for avoiding obstacles located on the path of the vehicle as part of the vehicle motion control. Hereinafter, the details of such obstacle avoidance support will be described.

Figure 2:
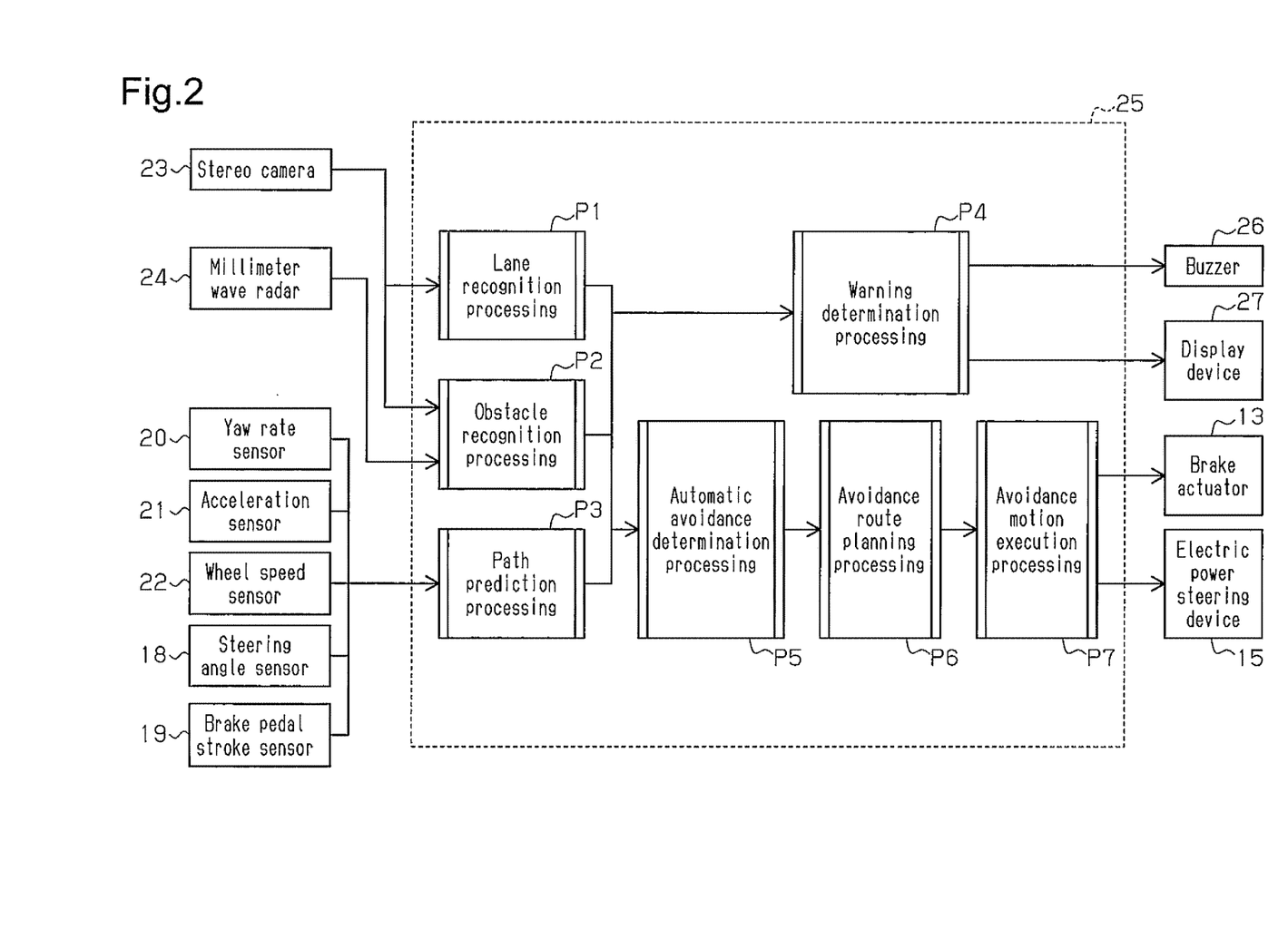
FIG. 2 is a block diagram showing a driving support processing carried out by the driving support system of FIG. 1.

FIG. 2 shows an overview of processing of the obstacle avoidance support performed by the electronic control unit 25. As shown in FIG. 2, the obstacle avoidance support is carried out through a lane recognition processing P1, an obstacle recognition processing P2, a path prediction processing P3, a warning determination processing P4, an automatic avoidance determination processing P5, an avoidance route planning processing P6, and an avoidance motion execution processing P7.

In the lane recognition processing P1, white lines, yellow lines, gutters, shoulder blocks, and the like of a road are extracted from the picked-up image data of the two cameras of the stereo camera 23, and also a relative position of boundary lines on both sides of a lane relative to the vehicle is calculated by using disparity between the picked-up images of the two cameras due to parallax.

In the obstacle recognition processing P2, confirmation of the presence or absence of an obstacle in the vehicle traveling direction and a relative position of that obstacle relative to the vehicle are calculated from the picked-up image data of the stereo camera 23 and the detection result of the millimeter wave radar 24.

In the path prediction processing P3, a future predicted route of the vehicle is calculated based on the current momentum of the vehicle grasped from the detection results of the yaw rate sensor 20, acceleration sensor 21, wheel speed sensors 22, and the like and a future momentum change of the vehicle predicted from the detection results of the steering angle sensor 18, brake pedal stroke sensor 19, and the like.

In the warning determination processing P4, the necessity for a warning is determined based on the positional information of the obstacle having been obtained in the obstacle recognition processing P2 and the predicted route of the vehicle having been calculated in the path prediction processing P3. Specifically, execution of a warning is determined to be required when an obstacle exists on the predicted route of the vehicle and also the distance between the obstacle and the vehicle or a predicted arrival time period for the vehicle to reach the obstacle becomes an established determination value D1 or less. When the warning is determined to be required, the warning to the driver is carried out through generation of a warning sound by the buzzer 26 and display of warning images by the display device 27.

In the automatic avoidance determination processing P5, the necessity for execution of automatic avoidance traveling is determined based on the positional information of the obstacle having been obtained in the obstacle recognition processing P2 and the predicted route of the vehicle having been calculated in the path prediction processing P3. Specifically, execution of the automatic avoidance traveling is determined to be required when the distance between the obstacle existing on the predicted route of the vehicle and the vehicle or a predicted arrival time period for the vehicle to reach the obstacle becomes a determination value D2 or less which is set smaller than the determination value D1 used for the foregoing warning necessity determination. In the present embodiment, the automatic avoidance traveling is carried out only during forward traveling in a straight-line lane on an expressway, and it is automatically determined at all other times that the automatic avoidance traveling is not required to be carried out.

In the avoidance route planning processing P6, planning of a route (avoidance route) of the vehicle for avoiding the obstacle is performed when the execution of the automatic avoidance traveling is determined to be required in the automatic avoidance determination processing P5. In the avoidance motion execution processing P7, the automatic avoidance traveling of the vehicle by control of the brake actuator 13 and electric power steering device 15 is performed according to the plan of the avoidance route.

Further, the automatic avoidance traveling in the present embodiment is performed by repeating avoidance motions combining yaw motion and deceleration motion the necessary number of times. Individual avoidance motion is performed while the yaw rate and the deceleration, that is, the deceleration g-force during the performance are kept constant.

Subsequently, the details of the avoidance route planning processing P6 will be described. Herein, a description of an embodiment of the avoidance route planning processing P6 will be given by taking as an example a case where the vehicle is in the following situation.

Figure 3:
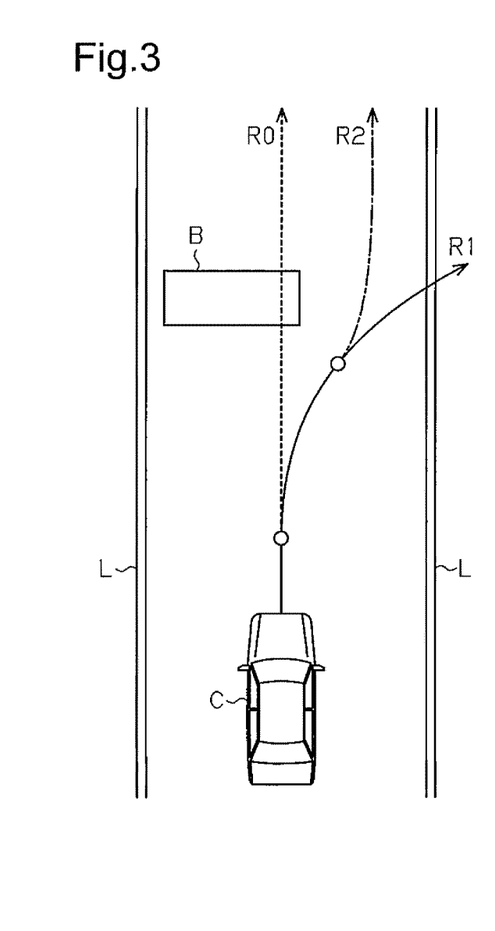
FIG. 3 is a diagram showing traveling conditions of a vehicle on which the device is mounted at the time when the driving support processing of FIG. 2 plans an avoidance route.

FIG. 3 shows traveling conditions of a vehicle C at the time of planning an avoidance route for the automatic avoidance traveling. At this time, the vehicle C travels along a lane, that is, parallel with white lines L on both sides of the lane, and a predicted route R0 of the vehicle C is also parallel with the lane. An obstacle B is located on the predicted route R0 of the vehicle C.

When the avoidance route is planned like a route R1 shown in FIG. 3, the obstacle B can be avoided but the vehicle C deviates from the lane afterwards. Therefore, to avoid the deviation from the lane, reverse-direction steering needs to be performed to return the traveling direction of the vehicle to the lane direction after the avoidance of the obstacle B, and the avoidance route needs to be set like a route R2 of FIG. 3.

Thus, in the present embodiment, an avoidance route capable of avoiding both contact with the obstacle B and deviation from the lane is obtained by planning the avoidance route in the following manner.

In planning the avoidance route, the electronic control unit 25 first performs setting of an area where an entry of the vehicle C needs to be avoided.

Figure 4:
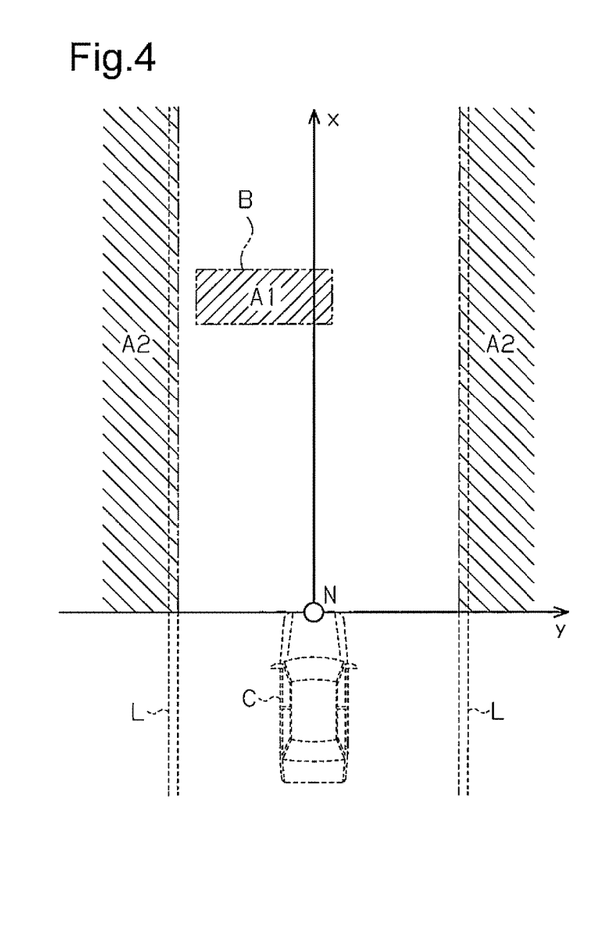
FIG. 4 is a diagram showing one example of a manner for setting an avoidance area in the traveling conditions of FIG. 3.

FIG. 4 shows an example of a manner of such setting of the avoidance area. The setting of the avoidance area is performed on two-dimensional coordinates with the origin of the current position N of the vehicle C and x-axis and y-axis of the current traveling direction and the width direction of the vehicle C respectively. The electronic control unit 25 sets an area corresponding to the position of the obstacle B on the two-dimensional coordinates as the first avoidance area A1 based on the relative position of the obstacle B having been calculated in the obstacle recognition processing P2. The electronic control unit 25 also sets an area corresponding to a part outside the lane on the two-dimensional coordinates as the second avoidance area A2 based on the relative position of the lane having been calculated in the lane recognition processing P1. Incidentally, the present embodiment makes it a precondition for the automatic avoidance traveling that the vehicle C is traveling straight ahead on the straight-line lane. Therefore, a boundary line of the second avoidance area A2 becomes parallel with x-axis of the two-dimensional coordinates.

Subsequently, the electronic control unit 25 searches for the first avoidance route Ra, which is a route of the vehicle C capable of avoiding the entry into the first avoidance area A1. At this time, when a plurality of routes exists, one of them is selected as the first avoidance route Ra. At this time, as the selection algorithm of the first avoidance route Ra, any given algorithm can be employed, and an algorithm described in, for example, International Patent Publication No. WO2013/051081 can be employed. Since preparation for the avoidance motions such as planning of the avoidance route requires a certain period of time, the starting point of the first avoidance route Ra is made a predicted position of the vehicle C at the point of time when the time required for the preparation elapses.

Figure 5:
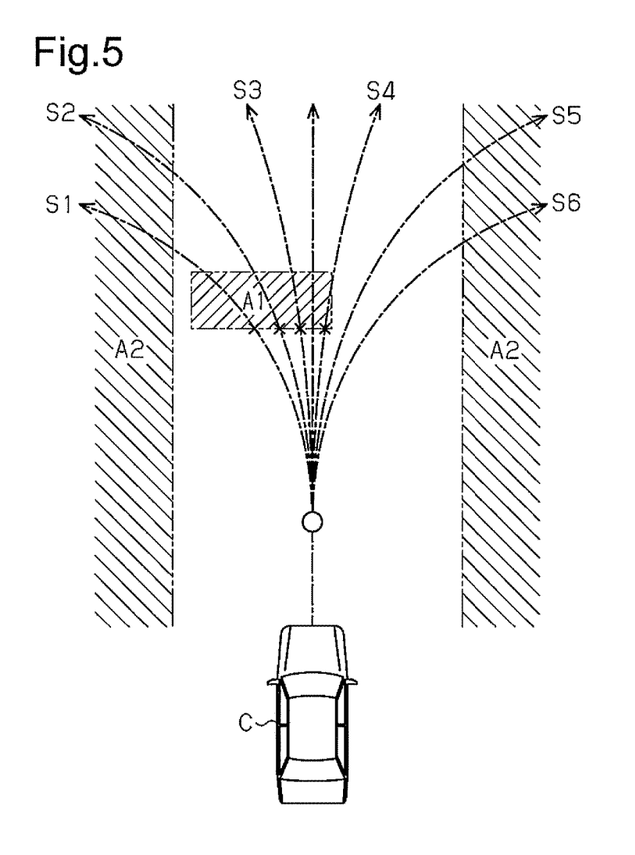
FIG. 5 is a diagram showing one example of a manner for searching for the first avoidance route relative to the avoidance area of FIG. 4.

FIG. 5 shows an example of a manner of such searching of the first avoidance route Ra. The electronic control unit 25 calculates predicted routes S1 to S6 of the vehicle C at the time of changing the yaw rate and the deceleration g-force and performing the first avoidance motion, respectively. The electronic control unit 25 then excludes the predicted routes S1 to S4 entering the first avoidance area A1 out of the predicted routes S1 to S6 from the candidate, and selects the first avoidance route Ra from between the remaining predicted routes S5 and S6.

At this time, the electronic control unit 25 obtains the predicted route by calculating each value of the following after the start of the avoidance motion at certain time intervals based on the current position coordinates and the speed of the vehicle C, the yaw rate of the avoidance motion, and the deceleration g-force. That is, the position coordinates (x, y) of the vehicle C on the foregoing two-dimensional coordinates; the vehicle speed Vel; the x-axis component Vx of the vehicle speed; the y-axis component Vy of the vehicle speed; and the deviation angle Adef in the traveling direction of the vehicle C with x-axis of the foregoing two-dimensional coordinates as the reference 0.

Next, the electronic control unit 25 searches for the second avoidance route Rb, which is a route of the vehicle C branched from the middle of the first avoidance route Ra and capable of avoiding entry into both the first avoidance area A1 and the second avoidance area A2.

Figure 6:
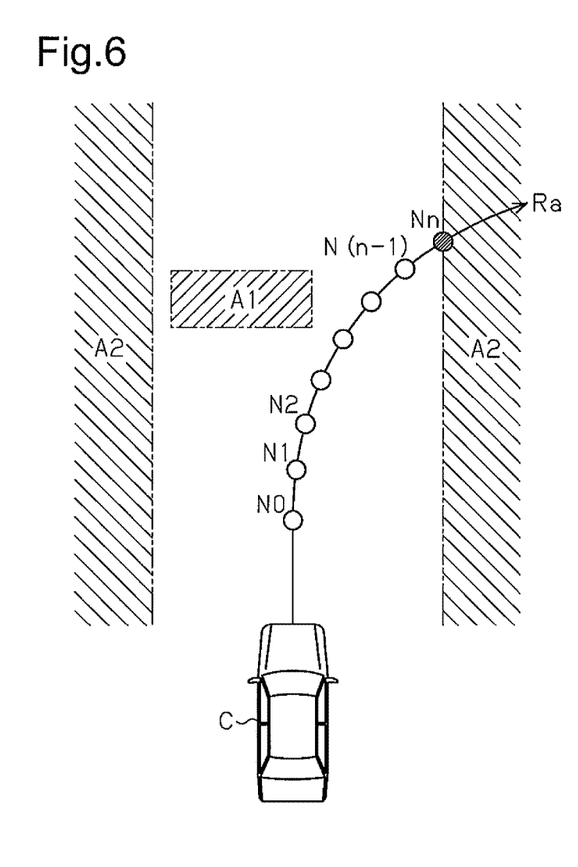
FIG. 6 is a diagram showing one example of a manner for setting the first avoidance route out of choices of FIG. 5.

When the first avoidance route Ra is set as shown in FIG. 6, the second avoidance route Rb is branched off any one of points N0 to Nn, of which the coordinates (x, y) have been calculated on the first avoidance route Ra. It is highly likely that only a route that cannot avoid entry into the first avoidance area A1 is found if the second avoidance route Rb is searched for with a point near the current position of the vehicle C on the first avoidance route Ra as a candidate position for the branch. Consequently, it is considered to be more efficient to set the branch position and search for the second avoidance route Rb in order from a point on the first avoidance route Ra, which is near the predicted entry point Nn, to the second avoidance area A. Thus, in order from the point near the predicted entry point Nn to the second avoidance area A2, the search for the second avoidance route Rb is carried out by repeating such search while shifting the branch position to the immediately previous point until an appropriate avoidance route is found.

If the search is carried out in such round-robin logic, however, an enormous amount of calculation may be required until the second avoidance route Rb is found in some cases. Accordingly, in the present embodiment, increase of calculation amount is suppressed by narrowing down points for a branch from the first avoidance route Ra to the second avoidance route Rb in advance.

Figure 7:
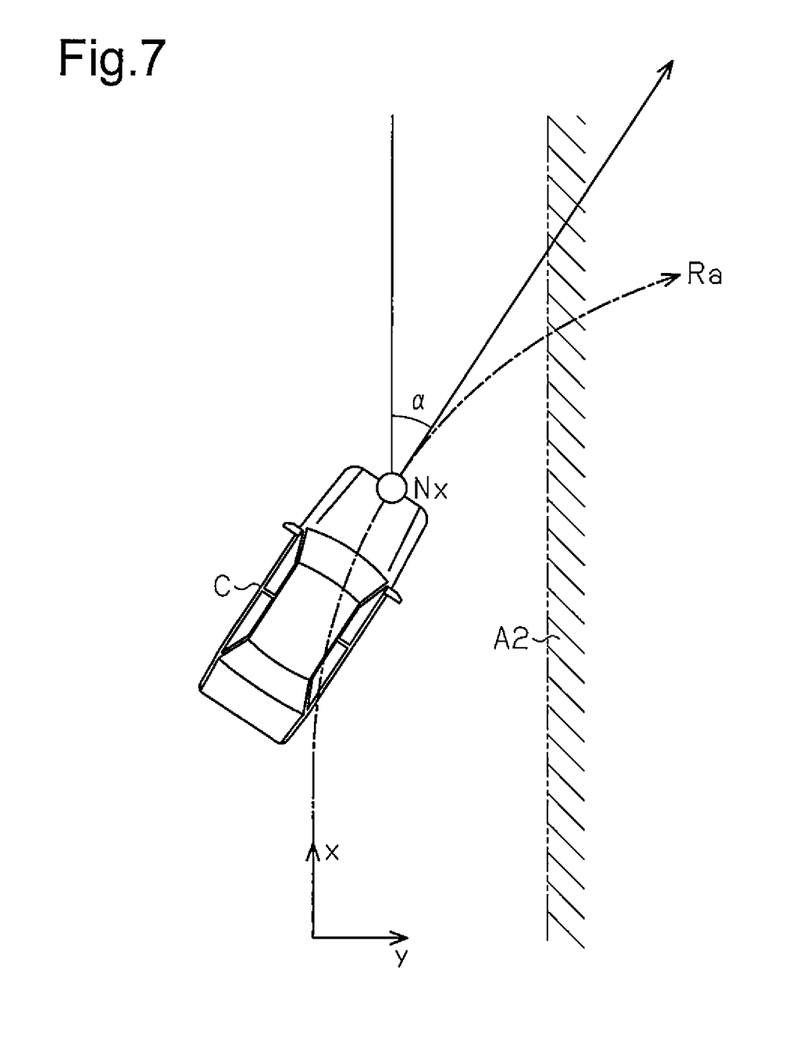
FIG. 7 is a diagram showing traveling conditions of the vehicle at the time of starting the second-stage avoidance motion in the first avoidance route of FIG. 6.

FIG. 7 illustrates a case in which the second-stage avoidance motion of the vehicle C is performed from the point Nx on the first avoidance route Ra. In this case, in order to avoid entry of the vehicle C into the second avoidance area A2, the yaw motion by a deviation angle alpha of the vehicle C at the point Nx needs to be performed by the time the vehicle C arrives at the second avoidance area A2.

Herein, the maximum value of yaw rate of yaw motion in the automatic avoidance traveling is denoted as the maximum yaw rate beta, and a time period until the vehicle C arrives at the second avoidance area A2 from the point Nx is denoted as an arrival time period T. At this time, the maximum value of the amount of change in yaw angle possibly made by the vehicle C until reaching the second avoidance area A2 becomes a value obtained by multiplying the maximum yaw rate beta by the arrival time period T. Thus, when the value obtained by dividing the deviation angle alpha of the vehicle C at the point Nx by the maximum yaw rate beta, that is, the quotient exceeds the arrival time period T, it can be said that the possibility that the entry into the second avoidance area A2 can be avoided is small even if the second-stage avoidance motion is started from that point Nx. Accordingly, in the present embodiment, an increase of the calculation amount is suppressed by limiting the branch position to a point on the first avoidance route Ra, at which the value (quotient) obtained by dividing the deviation angle alpha by the maximum yaw rate beta is not more than the arrival time period T to perform calculation of the second avoidance route Rb.

Incidentally, the position coordinates (x, y) of the vehicle C in the first avoidance route Ra are calculated at certain time intervals in the present embodiment, as described above. Therefore, by counting what number point the point is from the entering position into the second avoidance area A2 in the first avoidance route Ra among the points N0 to Nn on the first avoidance route Ra, the arrival time period T at that point can be roughly estimated. More specifically, where the time interval of calculating the coordinates (x, y) of each point N0 to Nn on the first avoidance route Ra is denoted as Delta T, a rough estimation can be made that the arrival time period T from the k-th point N (n−k) from the predicted entry point Nn to the second avoidance area A2 is a value obtained by multiplying the foregoing time interval Delta T by the value k (T=k×Delta T).

Figure 8:
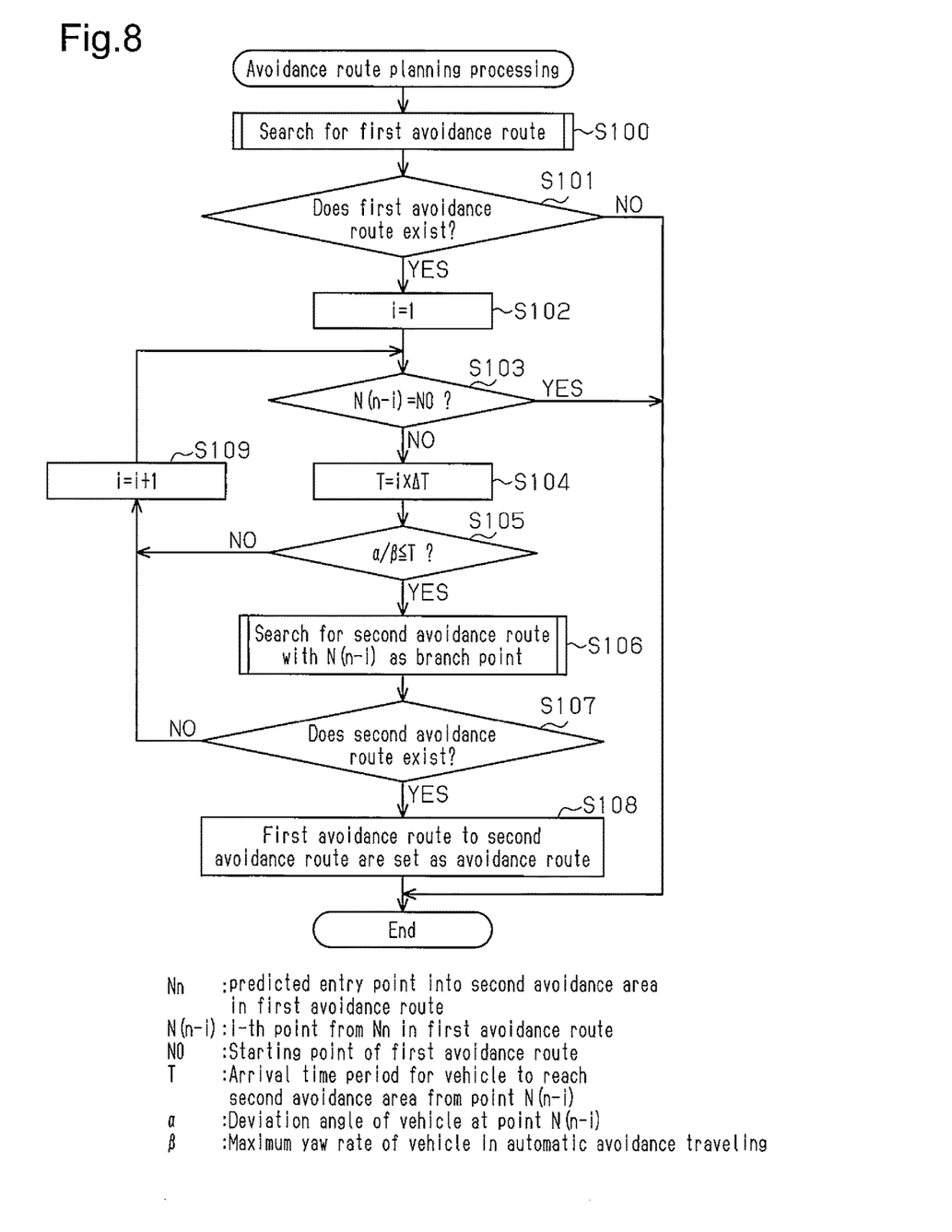
FIG. 8 is a flowchart showing procedures of an avoidance route planning processing performed by the driving support processing of FIG. 2.

FIG. 8 shows procedures by the electronic control unit 25 in the avoidance route planning processing P6.

Upon start of the avoidance route planning processing P6, a search for the first avoidance route Ra capable of avoiding entry of the vehicle C into the first avoidance area A1 is performed by the first avoidance motion in step S100, first. In the following step S101, it is determined whether the first avoidance route Ra exists. When the first avoidance route Ra does not exist (S101: NO), that is, when the entry of the vehicle C into the first avoidance area A1 cannot be avoided in the automatic avoidance traveling, the processing of the present routine this time is terminated as it is. In this instance, the vehicle C is stopped before the first avoidance area A1 by automatic control of the braking devices 12, for example, whereby the entry of the vehicle C into the first avoidance area A1 is avoided.

In contrast, when the first avoidance route Ra exists (S101: YES), the processing moves on to step S102. In that step S102, a value of the variable i is set at an initial value 1.

In the following step S103, it is determined whether the i-th point N (n−i) from the predicted entry point Nn into the second avoidance area A2 in the first avoidance route Ra among the points N0 to Nn, where the position coordinates (x, y) have been calculated on the first avoidance route Ra, is the starting point (point N0) of the first avoidance route Ra. When the point N (n−i) is the starting point (point N0) of the first avoidance route Ra (S103: YES), the processing of the present routine this time is terminated as it is, and entry avoidance into the first avoidance area A1 through a stop of the vehicle C by automatic control of the braking devices 12, for example, is attempted.

In contrast, when the point N (n–i) is not the starting point (point N0) of the first avoidance route Ra (S103: N0), the processing moves on to step S104. In that step S104, the arrival time period T of the vehicle C from the point N (n–i) to the second avoidance area A2 is calculated by multiplying the time interval Delta T of calculating the position coordinates (x, y) by the value of variable i at that time.

In the following step S105, it is determined whether the value, that is, the quotient obtained by dividing the deviation angle alpha of the vehicle C at the point N (n–i) by the maximum yaw rate beta is not more than the arrival time period T having been calculated in step S104. When the division value (alpha/beta) exceeds the arrival time period T (S105: NO), 1 is added to the value of the variable i in step S109 and then the processing is moved back to step S103.

On the other hand, when the foregoing division value (alpha/beta) is not more than the arrival time period T (S104: YES), the processing moves on to step S106. In that step S106, search for the second avoidance route Rb capable of avoiding entry of the vehicle C into both the first avoidance area A1 and the second avoidance area A2 by the second-stage avoidance motion is performed with the point N (n–i) as the branch point from the first avoidance route Ra.

In the following step S107, it is determined whether such second avoidance route Rb exists. When the second avoidance route Rb does not exist (S106: NO), 1 is added to the value of i in step S109, and then the processing is moved back to step S103.

In contrast, when the second avoidance route Rb exists (S106: YES), the processing moves on to step S108. In step S108, the searched route from the first avoidance route Ra up to the second avoidance route Rb is set as the route (avoidance route) of the automatic avoidance traveling, and then the avoidance route planning processing P6 is terminated.

The above present embodiment achieves following advantages.

(1) Points where the second avoidance route Rb is unlikely to exist even if set as the branch point are excluded in advance from the candidates for the branch point from the first avoidance route Ra at the time of searching for the second avoidance route Rb. Therefore, increase of calculation load can be suppressed. Moreover, points where the second avoidance route Rb is less likely to exist are merely excluded from the candidate points for the branch, and the candidate points for the branch are not particularly excessively limited. Thus, the range of choices of the avoidance route is broadened sufficiently. Therefore, the route for avoiding a plurality of objects to be avoided can be calculated more suitably.

(2) It is highly likely that only a route that cannot avoid entry into the first avoidance area A1 is found if a search for the second avoidance route Rb is carried out at a point near the starting point of the first avoidance route Ra. In that regard, in the foregoing embodiment, the search for the second avoidance route Rb is performed while shifting, in a limited range of the candidate points for the branch, the candidate points for the branch from a point near the second avoidance area A2 to a point far from the second avoidance area A2. Therefore, the search for the second avoidance route Rb can be performed more efficiently.

Another Method for Calculating Arrival Time Period T

In the foregoing embodiment, the arrival time period T is obtained as a time period until the vehicle C arrives at the second avoidance area A2 from the point on the first avoidance route Ra at the time of traveling along the first avoidance route Ra. Such arrival time period T can be obtained also as a time period until the vehicle C arrives at the second avoidance area A2 at the time of traveling straight ahead from the point on the first avoidance route Ra at the vehicle speed up to that point of time, for example.

Figure 9:
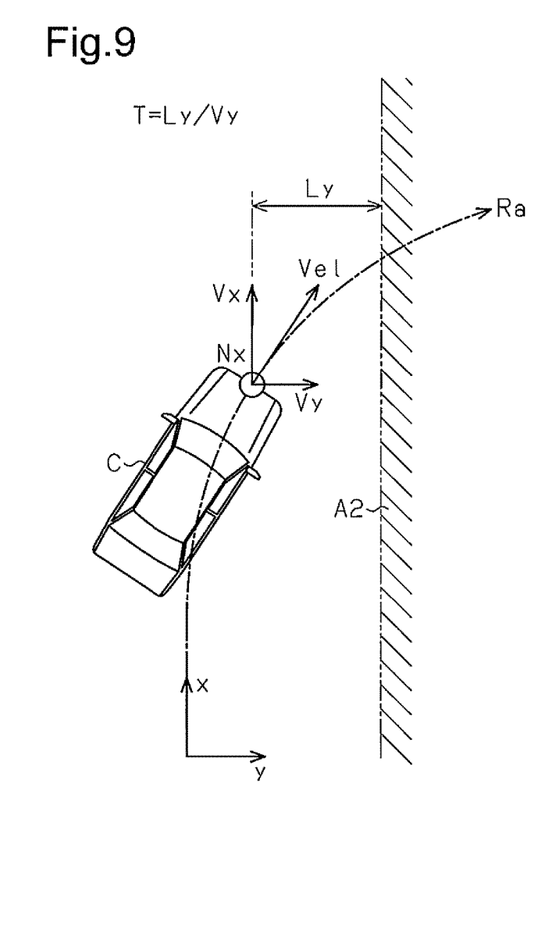
FIG. 9 is an explanatory diagram showing calculation of an arrival time period, which is different from FIG. 7.

FIG. 9 illustrates a case in which the vehicle C travels from the point Nx on the first avoidance route Ra at a certain vehicle speed. The coordinates (x, y) at the point Nx, the vehicle speed Vel, the x-axis component Vx of the vehicle speed, and the y-axis component Vy of the vehicle speed were obtained at the time of the calculation of the first avoidance route Ra. At this time, the arrival time period T of the vehicle C from the point Nx to the second avoidance area A2 can be obtained easily by dividing the distance Ly between the point Nx and the second avoidance area A2 in the y-axis direction by the y-axis component Vy of the vehicle speed at the point Nx.

Planning of Avoidance Route in Curved Road

In the foregoing embodiment, the description is limited to the case where the automatic avoidance traveling is carried out during straight ahead traveling in the straight-line lane. In this case, the traveling direction of the vehicle C at the time of planning the avoidance route and the edges (white lines) of the lane, which are boundary lines of the second avoidance area A2, become parallel. Therefore, at the point Nx on the first avoidance route Ra, the yaw angle of the vehicle C required to be changed for avoiding entry into the second avoidance area A2 no later than this entry becomes equal to the deviation angle Adef in the traveling direction of the vehicle C at the point Nx with x-axis as the reference 0. However, the yaw angle requiring the above change is not equal to the above deviation angle Adef in a curved road having a curvature that cannot be considered as a straight line.

Figure 10:
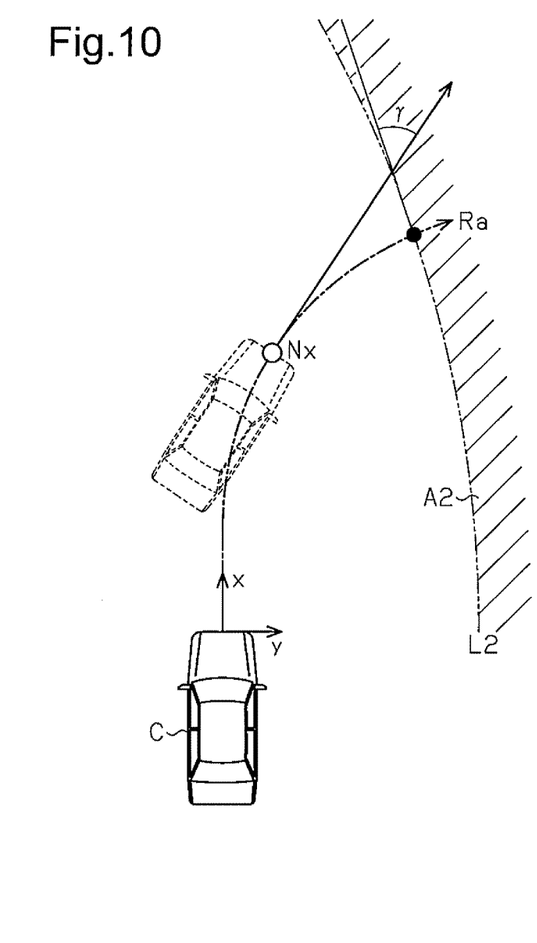
FIG. 10 is a diagram showing a manner for setting an avoidance route in a curved road, which is different from FIG. 9.

As shown in FIG. 10, in a case where the first avoidance route Ra is set in a curved road, a boundary line L2 of the second avoidance area A2 is not a straight line parallel with the x-axis but is a type of curve shown in FIG. 10. In such a case, to avoid entry into the second avoidance area A2, the traveling direction of the vehicle C needs to be changed at least up to the tangential direction of the boundary line of the second avoidance area A2 in the predicted entry point Nn by the time the vehicle C arrives at the second avoidance area A2.

For example, to start the second-stage avoidance motion from the point Nx on the first avoidance route Ra and avoid entry into the second avoidance area A2, at least a change in the yaw angle by an angle gamma formed between the tangential direction of the boundary line of the second avoidance area A2 at the predicted entry point Nn and the traveling direction of the vehicle C at the point Nx is required before arriving at the second avoidance area A2. When the value obtained by dividing the angle gamma by the maximum yaw rate beta exceeds the arrival time period T from the point Nx to the second avoidance area A2, it can be said that the second avoidance route Rb is less likely to be found even if the search is performed with the point Nx as the branch point. Accordingly, in such a case, the branch position is configured to be limited to a point on the first avoidance route Ra at which the value obtained by dividing the above angle gamma by the maximum yaw rate beta is not more than the arrival time period T to perform the calculation of the second avoidance route Rb.

Furthermore, the foregoing embodiment may be modified as follows:

The avoidance route relative to two objects to be avoided (the obstacle B and the white lines L) is calculated in the foregoing embodiment. However, calculation of an avoidance route relative to three or more objects to be avoided can be performed similarly. In such a case, an avoidance area is set for each of the objects to be avoided. After the search for the second avoidance route, the third avoidance route branched from a point on that second avoidance route is searched for in the same manner as the search for the second avoidance route, and the fourth avoidance route branched from a point on that third avoidance route is searched for. By repeating that, an avoidance route capable of avoiding each object to be avoided can be calculated.

The stereo camera 23 and the millimeter wave radar 24 are used to recognize the position of the object to be avoided in the foregoing embodiment. However, the detection may be performed in other ways. For example, the position of the object to be avoided can be recognized from beacons installed on the road or GPS signals.

The position of the object to be avoided is determined by using relative position coordinates with the current position of the vehicle C as the reference in the foregoing embodiment. However, it may be configured such that absolute position coordinates of the vehicle C are determined from GPS signals, for example, and the position of the object to be avoided is determined by using the absolute position coordinates.

The avoidance route is calculated by obtaining the position coordinates (x, y) of the vehicle C at each point on the route, the vehicle speed Vel, the x-axis component Vx of the vehicle speed, the y-axis component Vy of the vehicle speed, and the deviation angle Adef at certain time intervals in the foregoing embodiment. However, if there are any values among these values that is not particularly necessary for planning of the avoidance route, the calculation of the avoidance route may be performed without obtaining such values. Further, if there are any necessary values, such values may be additionally obtained at each point on the avoidance route and obtained.

The candidate points for the branch into the second avoidance route are limited to points on the first avoidance route at which alpha/beta smaller than or equal to T or gamma/beta smaller than or equal to T holds in the foregoing embodiment. As the above beta, the maximum value of the yaw rate in the yaw motion of the vehicle C at the time of the automatic avoidance traveling is used. However, it may be configured that a value slightly smaller than the maximum value of the yaw rate is set as the value of the above beta when the candidate points for the branch are desired to be limited in a range where an appropriate second avoidance route is more likely to exist. In other words, the value of the above beta is sufficient to be a certain yaw rate not more than the maximum yaw rate of the vehicle C.

The automatic avoidance traveling is configured to be performed by repeating the avoidance motion in which the yaw rate and the deceleration g-force are fixed in the foregoing embodiment. However, it may be configured such that the lateral acceleration, that is, the lateral g-force is fixed instead of the yaw rate to perform each avoidance motion or the acceleration is fixed instead of the deceleration g-force to perform each avoidance motion. Although the calculation of the avoidance route will be complicated, each avoidance motion can be configured to be performed while the yaw rate, the lateral g-force, the deceleration g-force, and the acceleration are each continuously changed.

In the foregoing embodiment, the calculation of the avoidance route in the case of maintaining the vehicle C within the lane and avoiding the obstacle B is described. However, the same method for calculating the avoidance route can be used when two obstacles are avoided. In such a case, an area where the second obstacle is located is set as the second avoidance area A2 and the calculation of the avoidance route is performed.

The automatic avoidance traveling is configured to be performed by using the calculated avoidance route in the foregoing embodiment. However, the calculation result of the avoidance route may be used for other purposes. For example, it can be configured to give instructions on an operation for avoiding the object to be avoided by the driver in a visual and auditory manner, based on the calculation result of the avoidance route.

DESCRIPTION OF THE REFERENCE NUMERALS

10: front wheel, 11: rear wheel, 12: braking device, 13: brake actuator, 14: braking pressure sensor, 15: electric power steering device, 16: motor, 17: steering torque sensor, 18: steering angle sensor, 19: brake pedal stroke sensor, 20: yaw rate sensor, 21: acceleration sensor, 22: wheel speed sensor, 23: stereo camera, 24: millimeter wave radar, 25: electronic control unit (route calculation device), 26: buzzer, 27: display device

The invention claimed is:

1. A route calculation device for a vehicle, comprising an ECU configured to:
   calculate a route of a vehicle on which the device is mounted,
   the route is for avoiding entry into two avoidance areas including a first avoidance area and a second avoidance area;
   calculate a second avoidance route after calculation of a first avoidance route,
   the first avoidance route is a route of the vehicle capable of avoiding entry into the first avoidance area,
   the second avoidance route is a route of the vehicle that branches off the first avoidance route and is capable of avoiding entry into both the first and second avoidance areas;
   determine a candidate point at which the second avoidance route branches off the first avoidance route at the time of calculating the second avoidance route;
   determine the candidate point based on a traveling direction and a speed of the vehicle at each point on the first avoidance route,
   a tangential direction of a boundary line of the second avoidance area at a predicted entry point into the second avoidance area, and
   a certain yaw rate not more than a maximum yaw rate of the vehicle; and
   control the vehicle based on the first avoidance route and the second avoidance route.

2. The route calculation device according to claim 1, wherein
   a traveling direction of the vehicle at a point on the first avoidance route and the tangential direction of the boundary line of the second avoidance area form an angle,
   a quotient is obtained by dividing the angle by the certain yaw rate, and the ECU is configured to limit the candidate point for the branch to any point on the first avoidance route at which the quotient is not more than an arrival time period for the vehicle to reach the second avoidance area from the point.

3. The route calculation device according to claim 1, wherein, when the boundary line of the second avoidance area is parallel with a traveling direction of the vehicle at a starting point of the first avoidance route, the ECU is configured to limit the candidate point for the branch to a point on the first avoidance route, a traveling direction of the vehicle at the point on the first avoidance route and the traveling direction of the vehicle at the starting point of the first avoidance route form an angle, a quotient is obtained by dividing the angle by the certain yaw rate, and the ECU is configured to limit the candidate point for the branch to a point on the first avoidance route at which the quotient is not more than an arrival time period for the vehicle to reach the second avoidance area from the point.

4. The route calculation device according to claim 2, wherein the ECU is configured to search for the second avoidance route while shifting, in a limited range of the candidate point for the branch, the candidate point for the branch from a point near the second avoidance area to a point far from the second avoidance area.

5. The route calculation device according to any on claim 2, wherein the ECU is configured to obtain the arrival time period as a time period until the vehicle arrives at the second avoidance area from any point on the first avoidance route at the time of traveling along the first avoidance route.

6. The route calculation device according to claim 2, wherein the ECU is configured to obtain the arrival time period as a time period until the vehicle arrives at the second avoidance area at the time of traveling straight ahead from the point on the first avoidance route at a vehicle speed at the point on the first avoidance route.

7. A route calculation method for calculating a route of a vehicle on which the a route calculation device comprising an ECU is mounted, wherein the route is for avoiding entry into two avoidance areas including a first avoidance area and a second avoidance area, the method comprising:

by the route calculation device, calculating a second avoidance route after calculation of a first avoidance route, wherein the first avoidance route is a route of the vehicle capable of avoiding entry into the first avoidance area, wherein the second avoidance route is a route of the vehicle that branches off the first avoidance route and is capable of avoiding entry into both the first and second avoidance areas;

by the route calculation device, determining a candidate point at which the second avoidance route branches off the first avoidance route at the time of calculating the second avoidance route;

by the route calculation device, determining the candidate point based on a traveling direction and a speed of the vehicle at each point on the first avoidance route, a tangential direction of a boundary line of the second avoidance area at a predicted entry point into the second avoidance area, and a certain yaw rate not more than a maximum yaw rate of the vehicle; and controlling the vehicle based on the first avoidance route and the second avoidance route.

8. A route calculation device for a vehicle, comprising an ECU configured to:

calculate a route of a vehicle on which the device is mounted, the route is for avoiding entry into two avoidance areas including a first avoidance area and a second avoidance area;

calculate a second avoidance route after calculation of a first avoidance route, the first avoidance route is a route of the vehicle capable of avoiding entry into the first avoidance area, the second avoidance route is a route of the vehicle that branches off the first avoidance route and is capable of avoiding entry into both the first and second avoidance areas;

determine a candidate point at which the second avoidance route branches off the first avoidance route at the time of calculating the second avoidance route;

determine the candidate point based on a traveling direction and a speed of the vehicle at each point on the first avoidance route, a tangential direction of a boundary line of the second avoidance area at a predicted entry point into the second avoidance area, and a certain yaw rate not more than a maximum yaw rate of the vehicle; and instruct a user of the vehicle, by a visual or an auditory command, on an operation for avoiding an object, based on the first avoidance route and the second avoidance route.

* * * * *